Nov. 29, 1960 — R. H. WISE — 2,962,309
CLUTCH MECHANISM
Filed Jan. 16, 1956 — 2 Sheets-Sheet 2
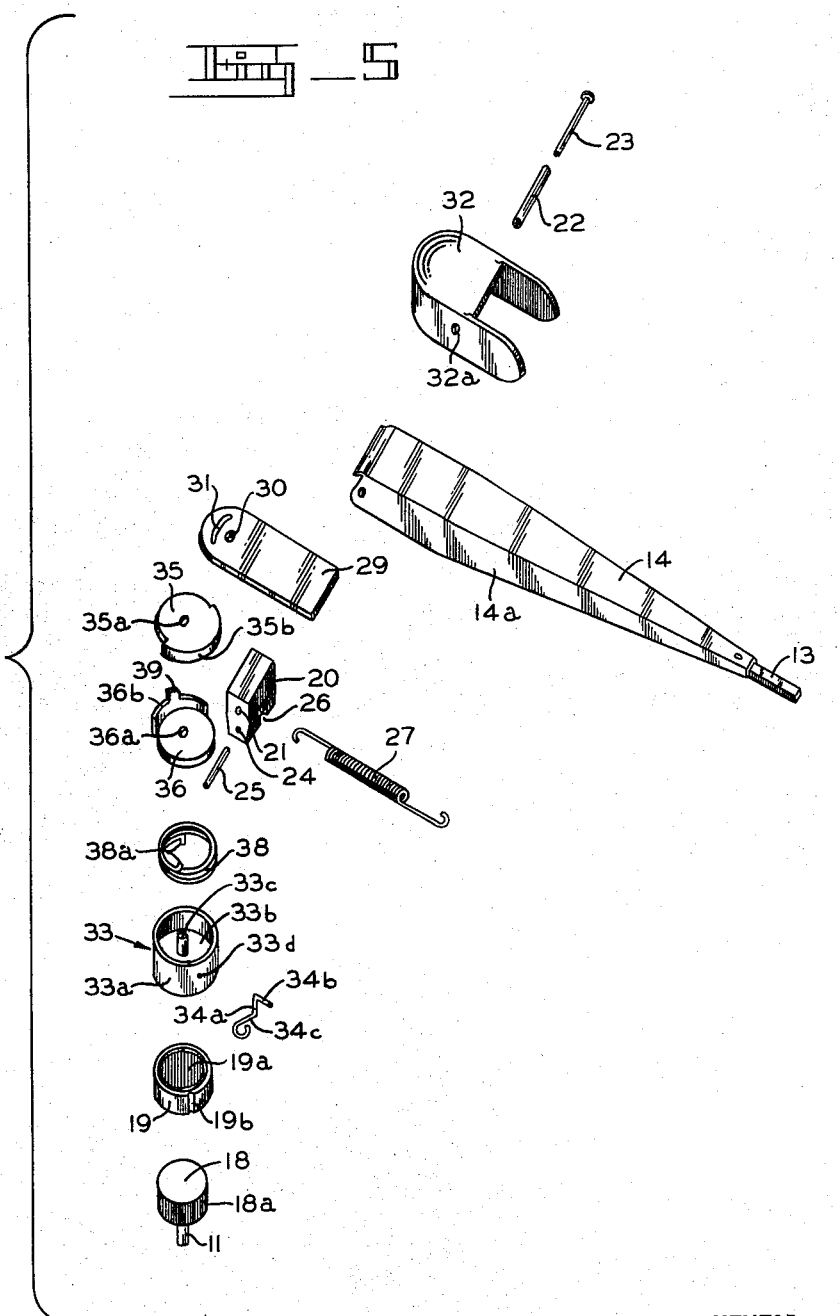
INVENTOR.
RALPH H. WISE
BY Wesley B. Taylor
ATTORNEY United States Patent Office 2,962,309
Patented Nov. 29, 1960

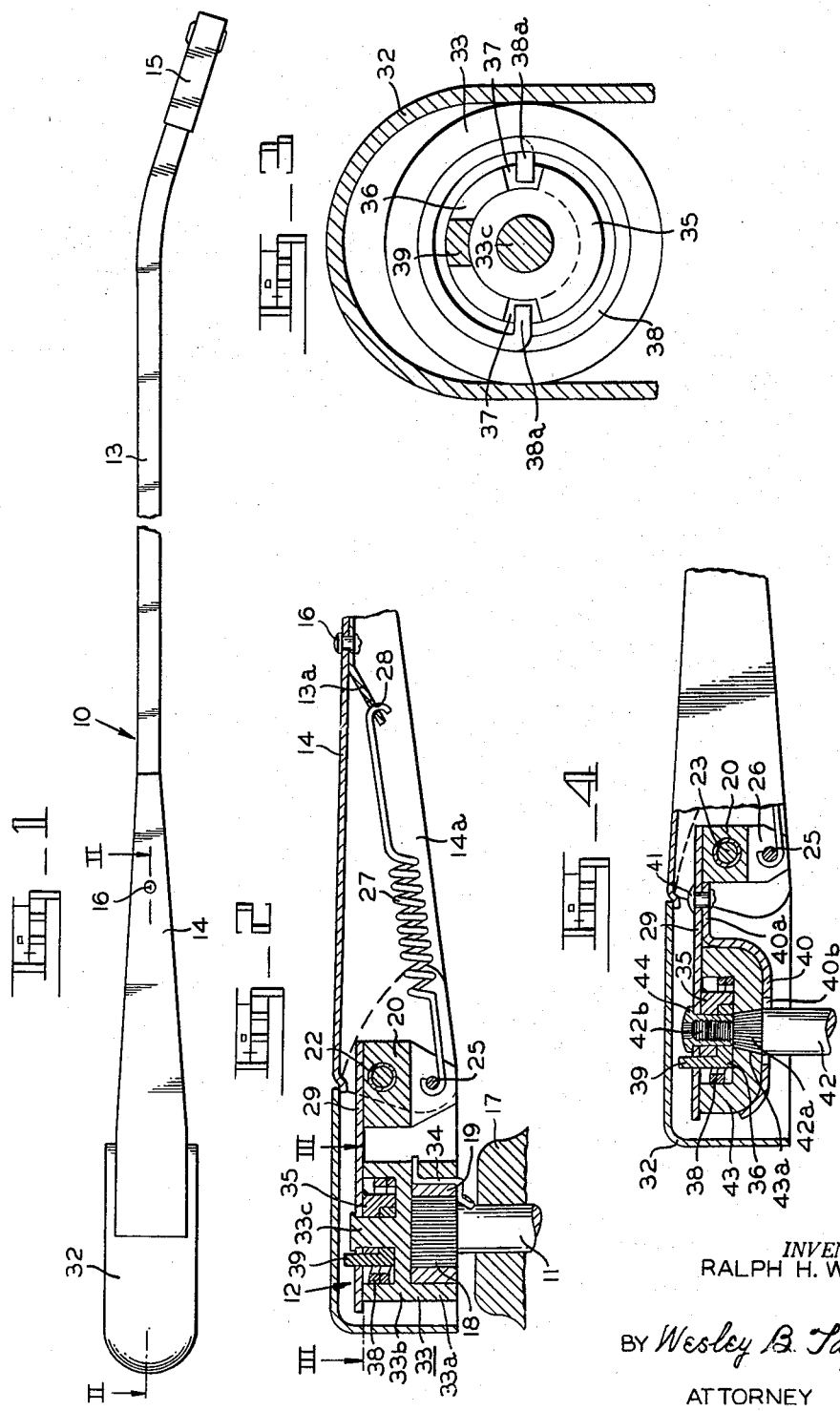

2,962,309

CLUTCH MECHANISM

Ralph H. Wise, Gary, Ind., assignor, by mesne assignments, to The Anderson Company, a corporation of Indiana Filed Jan. 16, 1956, Ser. No. 559,184

8 Claims. (Cl. 287—53)

The present invention relates to a clutch mechanism and, more particularly, to a clutch mechanism for finely adjusting the position of a windshield wiper assembly with respect to an actuating shaft or pivot.

In the windshield wiper art, it is customary to secure an arm which carries a wiping element to an actuating shaft. As the shaft rotates first in one direction and then the other, the arm and blade oscillate back and forth across a surface to be wiped, such as a windshield surface. In order to obtain a correct wiping arc which is suitably spaced from the perimeter of the windshield, the arm is ordinarily adjustably attached to the actuating shaft or pivot such that the arm may be secured to the shaft at various positions.

Heretofore, the diverse means employed for adjusting an arm with respect to a shaft are to my knowledge limited with respect to the minimum adjustment that can be made. For example, a common expedient is to provide an end of the actuating shaft with splines which mate with splines on an adjacent end of the arm. Since a spline of one part readily interfits between any two of the splines of the other part, some degree of selective positioning of the arm with respect to the shaft is possible. However, the fineness of the adjustment so obtained is limited. As a specific instance of one structure, each mating part has a total of 72 splines. This means that the fineness or smallest angle obtainable for adjustment purposes about the axis of the shaft is no greater than five degrees. Moreover, any angular adjustment between the arm and shaft must be a multiple of five degrees. This shortcoming has been peculiarly magnified by the tendency in recent years to use longer arms, for example, arms having a length of 14 to 16 inches. It can be appreciated that a minimum angular adjustment of five degrees becomes more serious as the arm length is increased, since the length of the arc through which the outer end of the arm moves for the smallest possible adjustment is correspondingly lengthened.

In addition, prior to making an adjustment of an arm about a shaft with prior means for this purpose, it is necessary to loosen a nut or screw member and/or to remove the arm entirely from the shaft. For example, in adjustment means embodying mating splined parts, the latter must be entirely pulled apart to permit any adjustment. Such apparatus may be further complicated in that a tool is required to engage a latch or detent and release the parts. Often the latch is not readily accessible, and the tool is inserted into the adjusting means and made to engage the latch only with inconvenience and difficulty.

The present clutch mechanism obviates the foregoing objections. With the instant clutch, the arm may be finely adjusted with respect to an actuating shaft through unlimited minimum angular increments about the axis of the shaft. Nor need the adjustment be a multiple of any given angle. Further, the arm need not be removed or otherwise separated from the shaft in order to effect this adjustment. In one form, for example, I fix one clutch element to the arm and operatively associate therewith a second clutch element which is free to move with respect to the first. The two clutch elements have spaced-apart portions to define recesses or passages therebetween. A coiled spring encircles the elements and normally bears against an attachment to the shaft. The spring has portions disposed in the recesses between the clutch elements, so that in cooperation with its frictional grip on the attachment, the spring prevents relative movement between the shaft and arm. When the second clutch element moves relative to the first element, the portions of the coiled spring in the recesses are engaged and thrust in a circumferential direction with respect to the coiled spring. The direction of this thrust action is such as to coil the spring more tightly and cause the coils of the spring to contract radially inwardly. This retracts the coils away from the attachment on the shaft and permits relative movement between the shaft and arm in any desired amount, however small.

The accompanying drawings illustrate a presently preferred embodiment wherein:

Figure 1 is a plan view of a windshield wiper arm assembly embodying the present invention;

Figure 2 is a fragmentary longitudinal section of Figure 1 on the line II—II;

Figure 3 is a fragmentary section of Figure 2 on the line III—III;

Figure 4 is a section similar to that of Figure 2 but illustrates a modified structure; and Figure 5 is an exploded, perspective view of the parts of Figure 2.

Referring to the drawings, the embodiment of Figures 1, 2, 3, and 5 includes an arm generally shown at 10, a shaft or pivot 11, and a clutch mechanism generally indicated at 12 which adjustably positions the arm 10 about the shaft 11.

More particularly, the arm 10 comprises a bar or rod 13 and an inverted U-shaped channel 14. At one end, the bar 13 terminates in a connector 15 which conventionally joins the arm to a wiping element, not shown. At the other end, a rivet 16 fixes the bar 13 to the channel 14. The shaft 11 extends toward the arm as from a cowl 17 of a vehicle and is suitably oscillated about its axis by standard means not shown. The shaft 11 terminates in a drum driver 18 having splines 18a on its outer periphery. A collar 19 has internal splines 19a which mate with those of the drum driver 18.

Suitable supporting means extend toward one another from the structures of the arm and shaft just described and are adapted at their juncture for relative movement. The instant clutch mechanism normally locks the arm and shaft against such relative movement, but the mechanism can be easily released from outside the wiper assembly and without a tool to permit any desired adjustment of the position of the arm 10 about the shaft 11.

For example, in the embodiment of Figures 1, 2, 3, and 5 a supporting block 20 extends between the sides 14a of the channel and has an opening or passage 21 to receive a concentric bearing sleeve 22 and pivot pin 23 so as to pivotally mount the channel 14 about the block 20. A second opening or passage 24 in the block accommodates a pin 25. A slot 26 in the block exposes a medial portion of the pin 25 to enable one end of a spring 27 to hook about this pin. The other end of the spring 27 engages an opening 28 in a bent inner end 13a of the bar, so that the spring 27 urges the arm 10 in a clockwise direction, as viewed in Figure 2, about the pivot pin 23. A mounting plate 29 fixed to the top of the block 20 and provided with an aperture 30 and arcuate slot 31 projects over the shaft 11. A cover 32 has its sides pivoted through openings 32a about the pin 23 and conceals the clutch mechanism 12 from view when the cover is in its lowered position, as illustrated in Figure 2.

A housing member 33 is fixed on the collar 19 of the shaft 11 and extends toward the mounting plate 29. The housing comprises a cylindrical portion 33a, a plate 33b extending across the cylindrical portion, and a substantially center post 33c which is integral with the plate 33b. The cylindrical opening defined by the lower part of the housing 33 receives the collar 19 in a press fit, and a latch or spring member 34 prevents separation of the parts axially. This spring has a central portion 34a and offset end portions 34b and 34c. The collar 19 has an external groove 19b to accommodate the central portion 34a of the spring, and the housing 33 is provided with an opening 33d through which the offset end portion 34b extends. The offset end portion 34c normally reaches below the collar 19 and the drum driver 18 (Figure 2) to prevent separation of the parts. The end portion 34c may be folded back on itself as illustrated to form a loop which is more easily caught for assembling or releasing the parts as hereinafter mentioned.

The center post 33c loosely passes through the opening 30 of the mounting plate 29 until the cylindrical portion 33a of the housing preferably abuts against the plate, after which the post may be rounded over, spiked, or otherwise enlarged (Figure 2) to prevent axial separation of the plate 29 and housing 33 while permitting relative rotational movement therebetween. The clutch elements are disposed in the housing about the post. A clutch disc 35 is fixed to the mounting plate 29 and has an opening 35a, to receive freely the post 33c, and a downwardly projecting rim 35b. As especially illustrated in Figure 5, the periphery of the rim 35b is placed at a greater radial distance from the opening 35a than the periphery of the remaining portion of the disc 35. A second clutch disc or driving clutch element 36 which is substantially of the same dimensions as disc 35 also has an opening 36a, freely to receive the post 33c, and an upwardly extending rim 36b. In the same manner, the periphery of rim 36b has a greater radial length from the opening 36a than the periphery of the remaining part of disc 36. Consequently, when the discs 35 and 36 are centered about the post 33c as shown in Figure 2, the rims 35b and 36b may be stationed opposite one another to define recesses or openings between their adjacent terminal portions or ends (Figure 3). A coiled spring 38 encircles the clutch discs and has inwardly turned ends 38a which are disposed in the recesses or openings 37 for engagement with the terminal portions of the rims. The coils of the spring 38 normally bear against the inner wall of the housing 33 opposite the post 33c. A tab or detent 39 integral with the rim 36b extends through the arcuate slot 31 of the mounting plate 29.

In the embodiment of Figure 4, parts similar to those of the first-described embodiment have the same reference numbers. In this case, a second mounting plate 40 is spaced from the mounting plate 29 for most of its length and has an upturned end 40a which is fixed to the plate 29 by a rivet 41. Plate 40 has an enlarged opening 40b to pass a shaft 42 which in this instance has a tapered spline portion 42a and an axial threaded portion 42b. A cylindrical housing 43 has a loose sliding fit between the plates 29 and 40 and is provided with a tapered splined opening 43a to mate with the tapered spline portion 42a of the shaft. A cap screw 44 extends through the opening 30 of the mounting plate 29 to engage the threaded portion 42b of the shaft and hold the parts in assembly.

In use, the arm 10 is attached to the shaft 11 of the first embodiment by press-fitting the housing 33 over the collar 19 with the medial portion 34a of the spring 34 aligned with the groove 19b of the collar. During this assembly, the offset end 34c of the spring is turned outwardly away from the shaft 11 to permit the housing to pass around the collar 19. The spring 34 is thereby torsionally twisted, so that when the offset end 34c is released following the placing of the housing about the collar 19, the end 34c springs back to the position shown in Figure 2.

Upon any attempted relative movement between the arm 10 and the shaft 11, one of the ends 38a of the spring, which are inserted between the ends of the rims 35b and 36b of the clutch elements, strikes the end of the rim of the disc 35 which is fixed to the mounting plate 29. Since the spring 38 is normally tensioned so as to bear outwardly against the inner wall of the cylindrical portion of the housing 33, any relative movement between the arm 10 and shaft 11 is limited to the small amount of "play" or permissive movement of the ends 38a of the spring in the recesses or passages 37.

When it is desired to adjust the position of the arm with respect to the shaft, the detent or tab 39 is pushed along the slot 31. No tool is needed for this purpose. A finger of a user may be readily used. Further, the detent is easily accessible as by simply lifting the cover 32. This action of the detent 39 pivots the driving disc 36 about the post 33c and strikes an end of the rim 36b against an end 38a of the spring to move it a slight distance in a circumferential direction with respect to the coiled spring 38. While the length of movement is small, as determined by the spacing of the ends of the rims 35b and 36b, the direction of movement is chosen so that the spring 38 is further tightened or tensioned. This causes the coils of the spring to contract radially inwardly and thus sufficiently retract from the wall of the housing 33 to break the frictional grip. The arm 10 can now be turned freely with respect to the housing 33 and shaft 11 and adjusted to any desired position. There is no minimum angle of adjustment, nor need the adjustment be a multiple of any given angle. In the form shown in Figure 2, the relative movement takes place between the housing 33, its post 33c and the mounting plate 29. When the detent 39 is released the coils of the spring 38 spread radially outwardly to engage the wall of the housing as before and prevent relative movement between the arm 10 and shaft 11. The embodiment of Figure 4 is used in the same manner, the relative movement for adjustment taking place between the housing 43 and cap screw 44 which move with the shaft 42 and the mounting plates 29 and 40.

Although the foregoing disclosure describes a presently preferred embodiment and a modification thereof, it is understood that the invention may be practiced in still other forms within the scope of the following claims.

I claim:

1. A clutch mechanism for adjustably attaching a member to a shaft including a housing secured to an end of the shaft for movement therewith, a clutch element fixed to the member and disposed in the housing, a second clutch element disposed in the housing, said clutch elements having spaced-apart abutments defining recesses and a coiled spring about the elements having inwardly turned ends disposed in the recesses for engaging the abutments and normally contacting a wall of the housing to prevent relative movement between the shaft and the member, said second clutch element being movable with respect to the first clutch element and shaft to engage either end of the spring to radially contract the coiled spring away from the wall of the housing to permit adjustment of the relative positioning of the shaft and member, said second clutch element having a manually engageable integral projection extending outwardly in spaced relationship to its longitudinal axis for rotating the element to cause retraction of said coiled spring.

2. A clutch mechanism for adjustably attaching a windshield wiper arm to a shaft including a housing secured to an end of the shaft, a post disposed in the housing, a clutch element fixed to the arm and having an rim extending into the housing, a second clutch element in the housing disposed about the post and having a rim opposed to the first rim, the extremities of the two rims being spaced from one another to define passages therebetween, a coiled spring encircling the clutch elements having inwardly turned ends extending into the passages, said spring normally contacting a wall of the housing to prevent relative movement between the arm and shaft, said second clutch element being movable about the post to engage either end of the spring in the passages and contract the coiled spring radially inwardly away from the wall of the housing to permit fine adjustment of the relative positioning of the shaft and arm.

3. A clutch mechanism for adjustably attaching a windshield wiper arm to an actuating shaft including a mounting plate secured to the arm and having a slot and opening, a housing secured to an end of the shaft, a post in the housing extending through the opening of the mounting plate and being rotatable therein, a clutch disc secured to the arm and having a rim disposed into the housing, a second clutch disc in the housing having an opening to receive the post and a rim opposed to the first rim, the extremities of the two rims being spaced from one another to define passages therebetween, a tab member on the second clutch disc extending through the slot of the mounting plate and accessible exteriorly of the housing, a coiled spring encircling the clutch discs having inwardly turned ends extending through the passages and normally contacting a wall of the housing to prevent relative movement between the arm and shaft, said second clutch disc being movable by the tab member about the post to engage either end of the spring in the passages and circumferentially tighten the spring to retract the coils thereof away from the wall of the housing and permit fine adjustment of the arm with respect to the shaft.

4. A clutch mechanism for adjustably attaching a windshield wiper arm to an actuating shaft including spaced-apart mounting plates secured to the arm and having aligned openings to rotatably receive the shaft, one plate also having a slot, means to retain the shaft in the aligned openings, a housing interposed between the mounting plates and rotatable with the shaft, a clutch disc fixed to one mounting plate having a rim disposed in the housing, a second clutch disc in the housing having an opening rotatably to receive the shaft and a rim opposed to the rim of the first clutch disc, the extremities of the two rims being spaced from one another to define passages therebetween, a tab member on the second clutch disc extending through said slot of one of the plates and accessible externally of the housing, a coiled spring tensioned radially inwardly encompassing the clutch discs and having inwardly directed portions extending into the passages, said spring normally pressing against a wall of the housing to prevent relative movement between the arm and shaft, the second clutch disc being movable about the shaft by the tab member to engage either of the inwardly directed portions of the spring and further tension the spring radially inwardly to retract the spring away from the wall of the housing and permit fine adjustment of the arm with respect to the shaft.

5. In a windshield wiper arm and shaft assembly, means to adjustably attach the arm to the shaft including a clutch housing secured to the shaft, a post member in the housing pivotally engaging the arm, a clutch element fixed to the arm and disposed in the housing, a driving clutch element disposed in the housing and rotatable about the axis of the post member, said clutch elements having terminal portions spaced apart to define openings therebetween, coiled resilient means surrounding the elements and having portions disposed in said openings for engaging said terminal portions and normally pressing against a wall of the housing to fix the arm with respect to the shaft, the driving clutch element serving to engage either of the portions of the resilient means in said openings upon movement about the post member and retract the resilient means from the wall to permit infinite adjustment of the arm to the shaft.

6. A windshield wiper arm comprising an inner driven member and an outer section pivotally connected to the driven member for supporting a wiper blade, said driven member being provided with a first cylindrical clutch element having a pair of circumferentially spaced portions, a drive member having an annular recess rotatably receiving said clutch element and also having a socket for receiving an actuating shaft, a second cylindrical clutch element rotatable in the recess and having a pair of portions which are disposed in circumferentially spaced opposed relationship to the said pair of portions on the first element, and coiled resilient means arranged in the recess about the clutch elements and having inturned portions disposed between the opposed pairs of portions on the clutch elements, said drive member when rotated in either direction causing one of the spaced portions on the first clutch to engage one or the other of the inturned portions on the resilient means to expand the latter to cause it to engage the inner surface of the recess to effect a driving connection between the members, and said second clutch being manually rotatable in either direction to cause one or the other of its spaced portions to engage one or the other of the inturned portions of the resilient means to contract the latter and thereby permit relative rotational movement between said members.

7. A windshield wiper arm having an inner section and an outer section pivotally connected to the inner section for supporting a wiper blade, a first clutch element fixed on said inner section and having a pair of circumferentially spaced portions, an elongate member pivotally connected to said inner section and provided with an annular recess at one end receiving said first clutch element and means at its other end for connection with an actuating shaft, a second clutch element arranged in the recess in close axial relationship with the first element and having a pair of circumferentially spaced portions disposed opposite the pair of spaced portions on the first element to define openings, coiled resilient means encircling the first clutch element and having inturned ends disposed in the openings between said pairs of portions, said resilient means normally engaging the member and preventing relative movement between the member and inner section and being retractible from said member by relative movement between the clutch elements to permit relative movement between the member and inner section and movement of the clutch elements with respect to said member.

8. A windshield wiper arm having an inner section and an outer section pivotally connected to the inner section for supporting a wiper blade, a member pivotally connected to said inner section and provided with an annular recess, a first clutch element fixed to said inner section and provided with a pair of circumferentially spaced portions, a second clutch element disposed in close axial relationship with the first element for movement with respect thereto and provided with a pair of circumferentially spaced portions disposed opposite the spaced portions on the first element, coiled resilient means encircling the elements, said clutch elements and said resilient means being disposed in said recess, said resilient means having inturned portions interposed between the said pairs of spaced portions on the the elements and normally engaging said member to prevent relative movement between this member and said inner section and being retractible inwardly away from said member by movement of the second clutch element relative to the first element to permit said relative movement between said member and inner section and movement of the clutch elements with respect to said member, manually engageable means connected to and extending outwardly from the second clutch element in spaced relationship to the longitudinal axes of the clutch elements to move the second clutch element relative to the first element to retract said resilient means, and means supported by said member for mounting and securing said member to a shaft.

References Cited in the file of this patent

UNITED STATES PATENTS

| | | |
|---|---|---|
| 1,629,277 | Koeb | May 17, 1927 |
| 2,317,245 | Bell | Apr. 20, 1943 |
| 2,528,678 | Anderson | Nov. 7, 1950 |
| 2,586,096 | Schaal | Feb. 19, 1952 |
| 2,598,993 | Gorske | June 3, 1952 |

UNITED STATES PATENT OFFICE
CERTIFICATION OF CORRECTION

Patent No. 2,962,309              November 29, 1960

Ralph H. Wise

It is hereby certified that error appears in the above numbered patent requiring correction and that the said Letters Patent should read as corrected below.

Column 3, line 46, for "openings between" read -- openings 37 between --; column 4, line 74, for "having an rim" read -- having a rim --; column 6, line 48, for "fram" read -- from --.

Signed and sealed this 2nd day of May 1961.

(SEAL)
Attest:

ERNEST W. SWIDER
Attesting Officer

DAVID L. LADD
Commissioner of Patents